(No Model.) 3 Sheets—Sheet 1.

C. M. YOUNG.
HARVESTING MACHINE.

No. 252,854. Patented Jan. 24, 1882.

(No Model.) 3 Sheets—Sheet 2.

C. M. YOUNG.
HARVESTING MACHINE.

No. 252,854. Patented Jan. 24, 1882.

Witnesses.
Franck L. Durand
R. M. Smith

Inventor
C. M. Young
by A. M. Smith & Co.
Attorneys

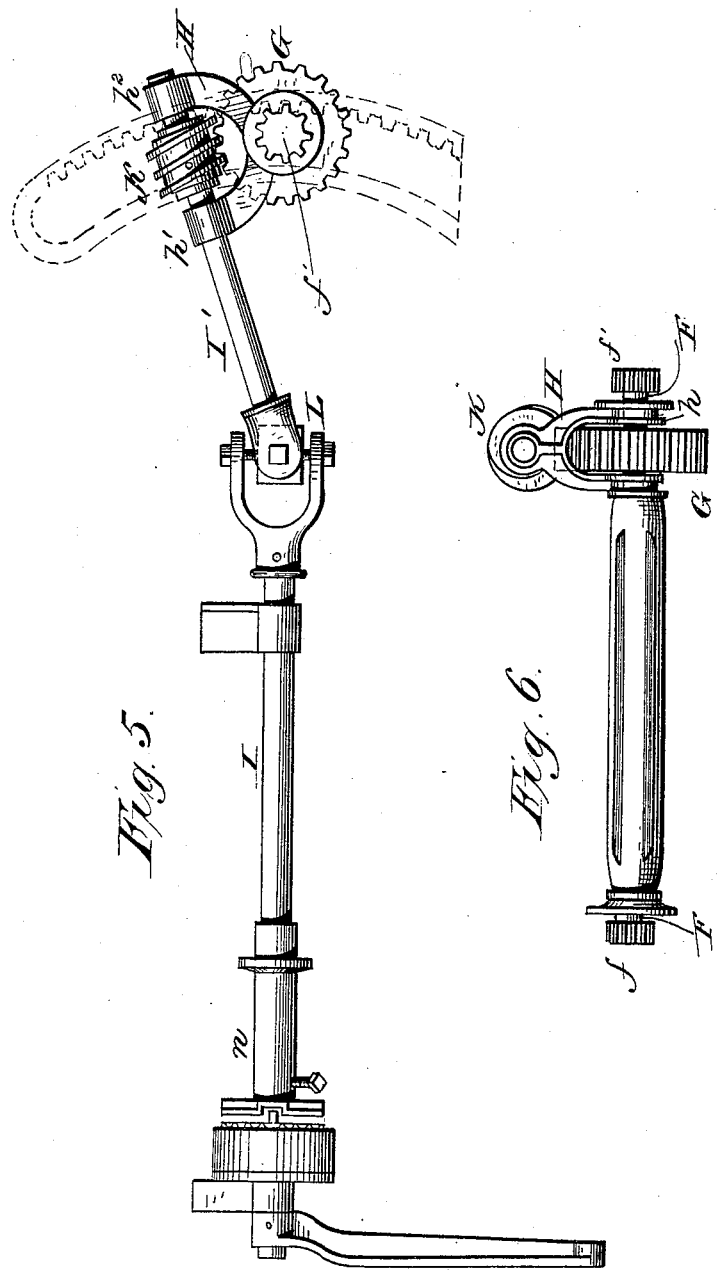

UNITED STATES PATENT OFFICE.

CHARLES M. YOUNG, OF CORRY, PENNSYLVANIA.

HARVESTING-MACHINE.

SPECIFICATION forming part of Letters Patent No. 252,854, dated January 24, 1882.

Application filed September 24, 1881. (No model.)

*To all whom it may concern:*

Be it known that I, CHARLES M. YOUNG, of Corry, county of Erie, State of Pennsylvania, have invented new and useful Improvements in Harvesting-Machines, of which the following is a full, clear, and exact description, reference being had to the accompanying drawings, making part of this specification, in which—

Figure 1:
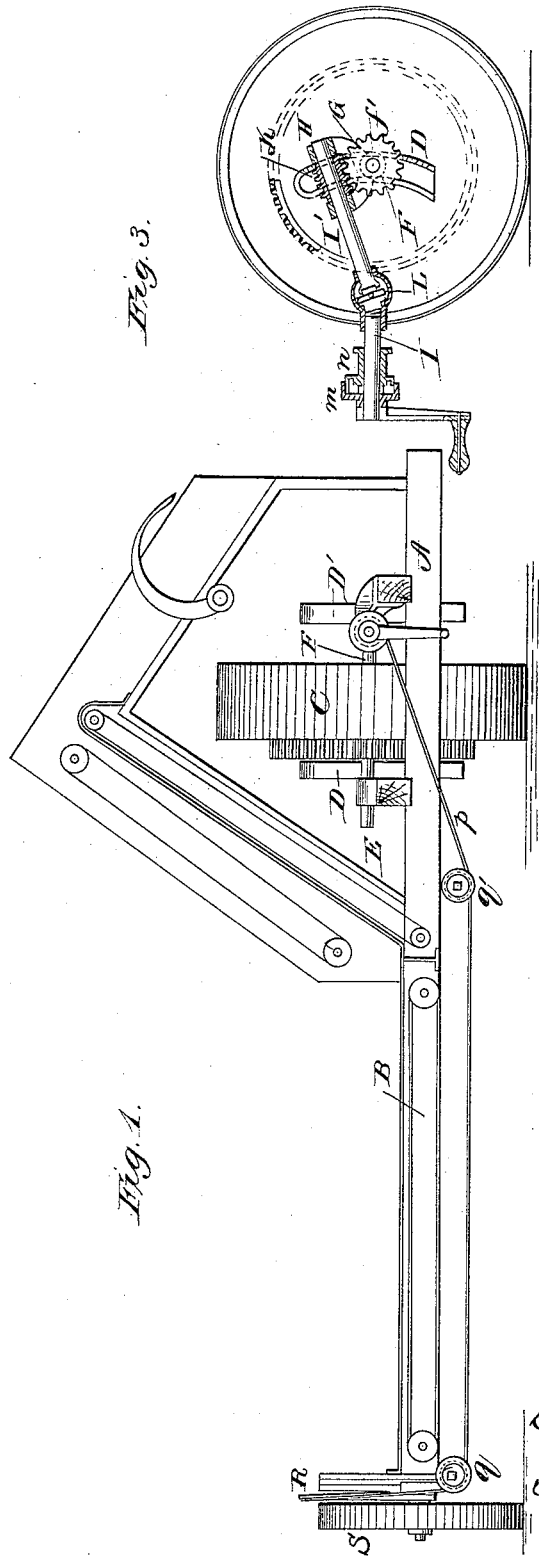
Figure 2:
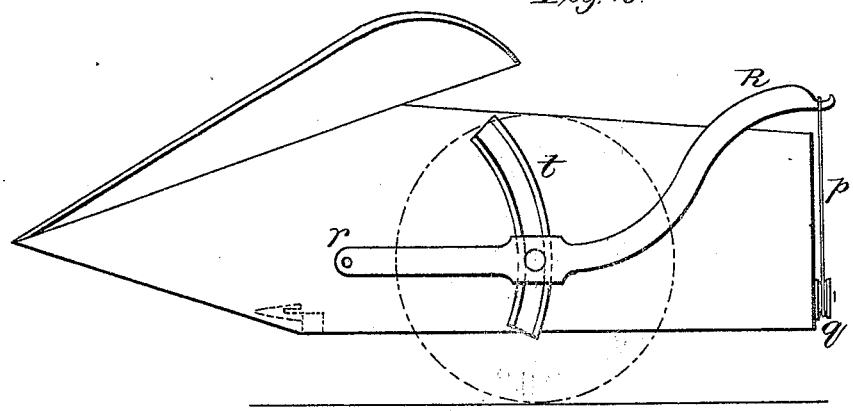
Figure 4:
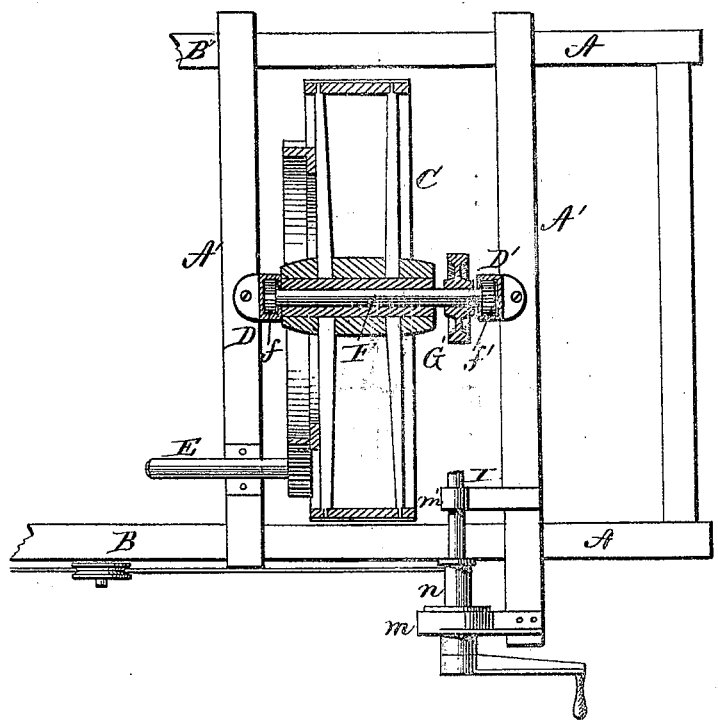

Figure 1 is a rear elevation of a harvesting-machine with my improvements applied. Fig. 2 is a side elevation of the grain side or end of the platform. Fig. 3 is a side elevation, partly in section, showing the relation of the lifting devices to the main drive-wheel. Fig. 4 represents a horizontal section through the main drive-wheel, &c. Fig. 5 is a side elevation of the lifting devices detached and enlarged, and Fig. 6 is a front elevation of the main axle with its pinions and actuating worm-gear.

My invention relates to that class of harvesting-machines employing curved rack-standards on the frame in connection with pinions on the main drive-wheel axle in mesh with said curved racks, and which are rotated with the axle for raising and lowering the frame; and it consists in the combination, with the main drive-wheel axle, having pinions operating through the curved racks to raise and lower the frame, as described, of a worm-wheel engaging with and operated by means of a worm or screw on a tumbling-shaft, for rotating the axle and raising and lowering the frame, as hereinafter explained.

It further consists in the combination, with the shaft through which the drive-wheel axle with its pinions is rotated for raising and lowering the main frame, of a sheave and cord or chain actuating the lever carrying the outer or grain wheel, and thereby raising or lowering the outer end of the platform simultaneously with the raising or lowering of the main frame, as hereinafter explained.

In the accompanying drawings, A A' represent the main frame of the machine, and B B' the platform-frame bars, the latter forming lateral extensions of the transverse bars A of the main frame, and connected therewith in any usual or preferred manner.

Upon the longitudinal frame-bars A' A', on opposite sides of the main driving-wheel C, and about midway of their length, are secured two curved standards, D D', each provided with a toothed rack formed in an arc of a circle of which the pinion-shaft E is the center. These standards are grooved, or have hooked or angular flanges upon their adjacent sides, in front and in rear, forming a curved groove between them, within which the toothed rack is formed. The grooves in the standards D D' are open at their lower ends to admit the pinions $f f'$ on the ends of the drive-wheel ax'e F, and the angular or hooked outer edges of the flanges overhang the inner adjacent faces of said pinions, preventing their lateral displacement, and by resting in contact with the axle serving to hold the pinions in mesh with the curved racks. The pinions $f f'$ are fast on the axle, and the latter being upheld at a given height from the ground by the driving-wheel C, mounted upon it, it follows that when a rotary movement is imparted to said axle the pinions, acting on the curved racks, will raise or lower the main frame, according to the direction of rotation of the axle.

Upon the axle is secured a worm-wheel, G, and adjacent to this wheel, upon the axle, is mounted a yoke, H, provided on its lower end with a sleeve, $h$, or eye-bearing turning on the axle, and having its upper end forked and provided with bearings $h' h^2$, in which one end, I', of a jointed tumbling-shaft, I I', is mounted. (See Fig. 5.) The lower end of this yoke H may also be forked, if desired, so as to stride the worm-wheel G, as shown in Fig. 6.

Between the arms $h' h^2$ the shaft I' is provided with a worm or screw, K, which engages with and rotates the wheel G, with the axle and the pinions secured thereto, when the shaft I I' is rotated. The part I' of the tumbling-shaft is connected with the part I at a point in line with the pinion-shaft E, or thereabout, through a universal joint at L, adapting said part I' to vibrate as the standards D D' rise or fall relatively to said pinion shaft as a center. By this arrangement of the portion I' of the tumbling-shaft and of its bearings in a yoke swiveling on the axle it will be seen that the worm or screw K is made to maintain always a fixed working relation to the worm-wheel, whatever may be the variation in its angle of relation to the frame or to the portion I, which is mounted in fixed bearings $m$ and $m'$ on said frame. The bearing-bracket m is made in the form of or is provided with an internally-cogged annular flange or rim, and a sleeve surrounding the shaft I passes through the bearing therein and has an eccentric formed on its inner end carrying a pinion which engages with and is actuated by said toothed rim. This pinion is provided on its forward face with pins which enter grooves in the rear adjacent face of a sheave, n, the arrangement of said parts and of the crank on the end of the sleeve which carries the eccentric being similar to that described in a patent granted to me September 27, 1881, No. 247,592. By this arrangement a powerful lifting device is provided, by means of which the frame can be readily and easily raised, with all its heavy attachments, for raking, binding, &c., and one also which is adapted to lock or hold said frame at any height to which it may be adjusted without the aid of separate locking devices, as explained in said former application. The sheave n is fast on and turns the shaft I as it is rotated, and has one end of a cord or chain, p, secured to and wrapping it, said cord extending under suitable guiding-sheaves, q q', on the rear platform frame bar, its outer end passing up to and being connected with the rear end of a lever, R, pivoted at its forward end at r to the shoe or dividing-board.

S is the outer grain or carrying wheel, (shown in dotted lines, Fig. 2,) the shaft of which may be either directly connected with the lever or with a block sliding in a curved way, t, on the divider-board, said block being connected to and moving with the lever R. Where the latter arrangement is employed the curved track or way t will be formed in the arc of a circle of which the pivot r is the center, said block being made thereby to maintain a fixed relation to the lever, while at the same time it serves to steady the latter in its movements. By this arrangement of parts for raising the outer end of the platform it will be seen that as the tumbling-shaft I I' is rotated for raising or lowering the main frame the lever R and grain-wheel S will be simultaneously acted upon for raising or lowering the outer end of the platform. This has ordinarily not been found practicable, owing to the great weight to be lifted in this class of machines, carrying both the raking and the binding mechanism, or men binding by hand in lieu of the latter; but by my arrangement of lifting mechanism described in detail in my patent above referred to, by which I obtain a reduction of speed by gearing down, with a corresponding increase of power, the attendant is enabled with ease to adjust simultaneously both sides or ends of the platform and cutting apparatus, and without leaving his seat on the machine for that purpose, as the crank for operating the tumbling-shaft may be arranged within convenient reach of the driver in his seat.

Parts of the machine not particularly described may be constructed and arranged in any usual or preferred way.

Having described my invention, I claim—

1. In a harvesting-machine in which the main frame is raised or lowered by means of pinions on the axle working in curved rack-standards on the frame, the combination, with the axle, of the worm-wheel fast thereon, and the worm or screw on the tumbling-shaft for actuating the same, and the shaft and pinions, substantially as described.

2. In a harvesting-machine in which the main frame is raised and lowered by means of pinions on the axle working in curved rack-standards on the frame, the jointed or tumbling worm-shaft for actuating said pinions through a worm-wheel on the axle, in combination with the sheave on the fixed portion of the shaft, and the cord or chain connecting it with the grain-wheel lever for operating the same, and raising or lowering the outer end of the platform simultaneously with the raising or lowering of the main frame, substantially as described.

In testimony whereof I have hereunto set my hand this 19th day of September, A. D. 1881.

CHARLES M. YOUNG.

Witnesses:
W. N. HUSTED,
W. A. NICHOLS.